US008578167B2

(12) United States Patent
Miyamoto et al.

(10) Patent No.: US 8,578,167 B2
(45) Date of Patent: *Nov. 5, 2013

(54) SYSTEM, APPARATUS, METHOD, AND PROGRAM PRODUCT FOR AUTHENTICATING COMMUNICATION PARTNER USING ELECTRONIC CERTIFICATE CONTAINING PERSONAL INFORMATION

(75) Inventors: Takashi Miyamoto, Chofu (JP); Kohsuke Okamoto, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/456,431

(22) Filed: Apr. 26, 2012

(65) Prior Publication Data

US 2012/0272066 A1 Oct. 25, 2012

Related U.S. Application Data

(63) Continuation of application No. 11/842,482, filed on Aug. 21, 2007, now Pat. No. 8,225,096.

(30) Foreign Application Priority Data

Oct. 27, 2006 (JP) .................................. 2006-293253

(51) Int. Cl.
*H04L 9/32* (2006.01)
*H04L 29/06* (2006.01)
(52) U.S. Cl.
USPC .......................................... 713/175; 713/156
(58) Field of Classification Search
None
See application file for complete search history.

(56) References Cited

U.S. PATENT DOCUMENTS 6,189,096 B1 2/2001 Haverty
6,367,009 B1 4/2002 Davis et al.
6,393,563 B1 5/2002 Maruyama et al.
(Continued)

FOREIGN PATENT DOCUMENTS

JP 2003124926 A 4/2003
JP 2005328408 A 11/2005

OTHER PUBLICATIONS

Dierks et al., "The Transport Layer Security (TLS) Protocol", RFC 4346 [online], Apr. 2006 [retrieved Sep. 22, 2006], URL: http://www.ietf.org/rfc/rfc4346.txt.
"Koteki Ninshou Sabisu Potaru Saito (Public Individual Authentication Services Portal Site)", [online], Jan. 29, 2004, Koteki Kojin Ninshou Sabisu Todouhuken Kyougikai (Prefectural Association for JPKI), [retrieved Sep. 22, 2006], URL: http://www.jpki.go.jp/index1.html>, English abstract only.

(Continued)

*Primary Examiner* — David Garcia Cervetti
*Assistant Examiner* — Fatoumata Traore
(74) *Attorney, Agent, or Firm* — H. Barrett Spraggins; Cynthia G. Deal; Biggers & Ohanian, LLP

(57) ABSTRACT

Object To provide a technique for authenticating a communication partner using an electronic certificate containing personal information. Solving Means When a client apparatus receives a request for an electronic certificate from a server apparatus, the server apparatus reads a client certificate containing personal information and a server public key of the server apparatus from a storage unit and encrypts the client certificate using the server public key. The client apparatus also creates a temporary electronic certificate by setting, in a basic field of an electronic certificate, a predetermined item indicating that the electronic certificate is a temporary electronic certificate and by setting the client certificate having been encrypted in an extension field of the electronic certificate. Then, the client apparatus sends the temporary electronic certificate to the server apparatus.

13 Claims, 11 Drawing Sheets

(56) References Cited

U.S. PATENT DOCUMENTS

| | | |
|---|---|---|
| 6,745,327 B1 | 6/2004 | Messing |
| 6,807,577 B1 | 10/2004 | Gillespie et al. |
| 7,039,805 B1 | 5/2006 | Messing |
| 2003/0115475 A1* | 6/2003 | Russo et al. ............ 713/186 |
| 2004/0133781 A1 | 7/2004 | Guillou |
| 2005/0015600 A1 | 1/2005 | Miyazaki et al. |
| 2008/0104401 A1 | 5/2008 | Miyamoto et al. |
| 2009/0055642 A1 | 2/2009 | Myers et al. |

OTHER PUBLICATIONS

Office Action, U.S. Appl. No. 11/842,482, Mail Date Oct. 15, 2010, 17 pp.
Office Action, U.S. Appl. No. 11/842,482, Mail Date Mar. 25, 2011, 16 pp.
Final Office Action, U.S. Appl. No. 11/842,482, Mail Date Aug. 24, 2011, 17 pp.
Notice of Allowance, U.S. Appl. No. 11/842,482, Mail Date Mar. 8, 2012, 24 pp.

* cited by examiner

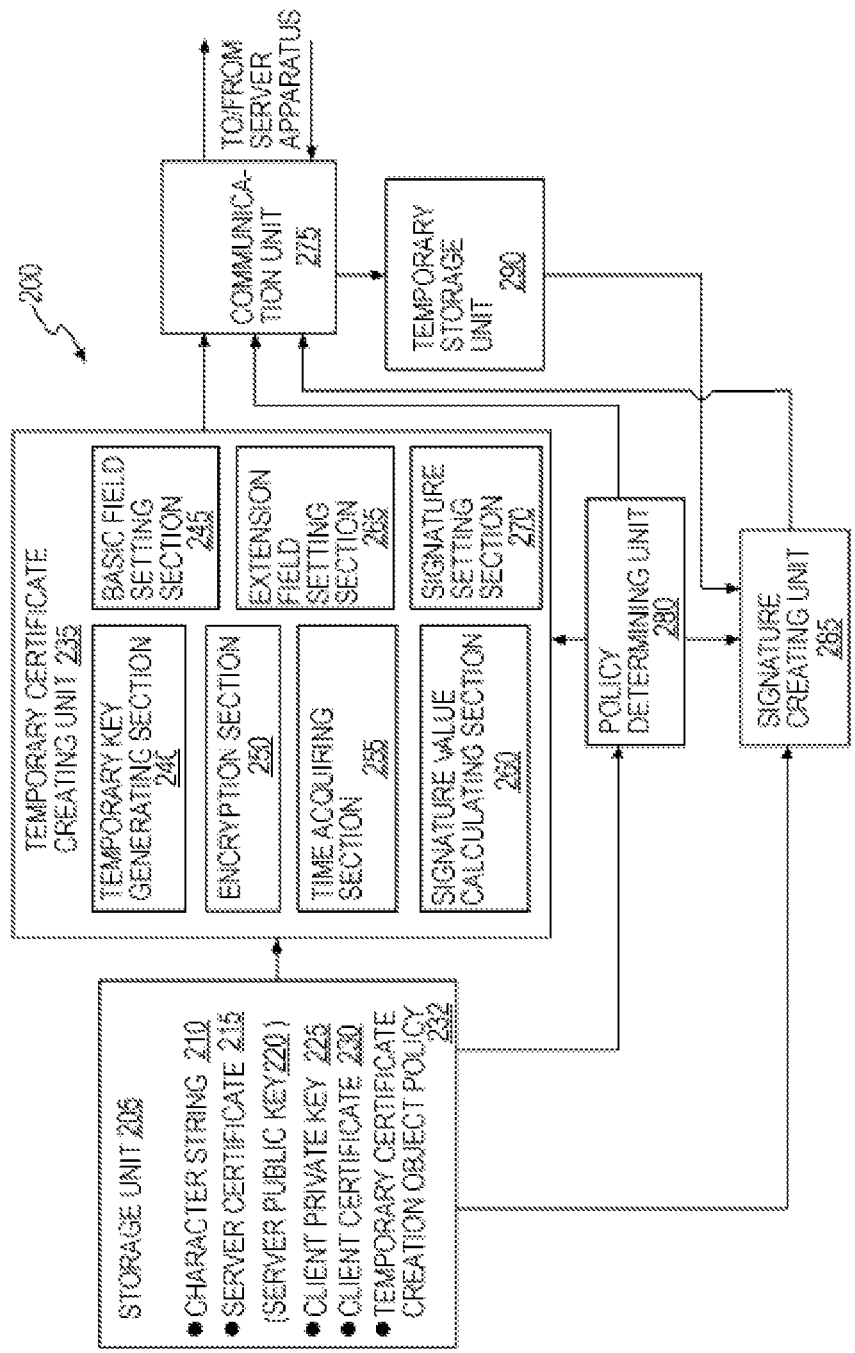

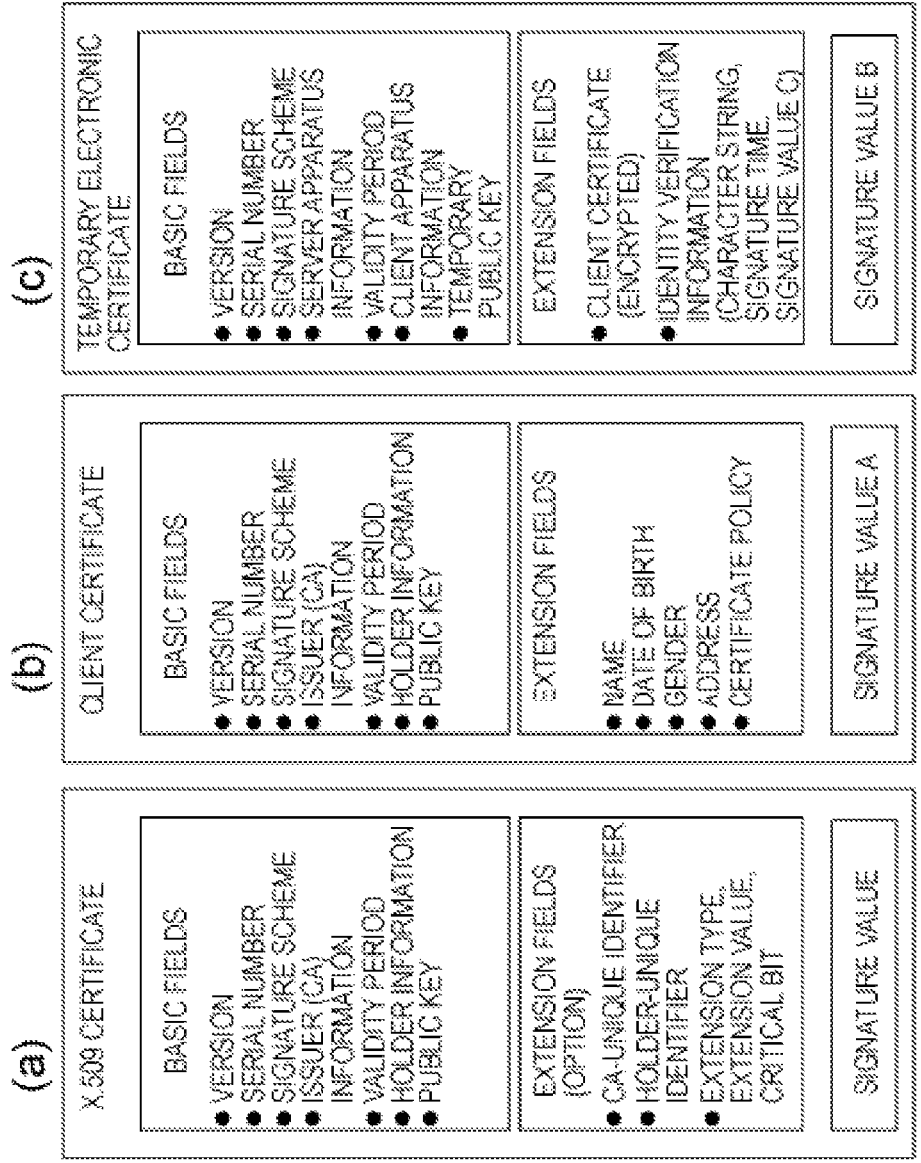

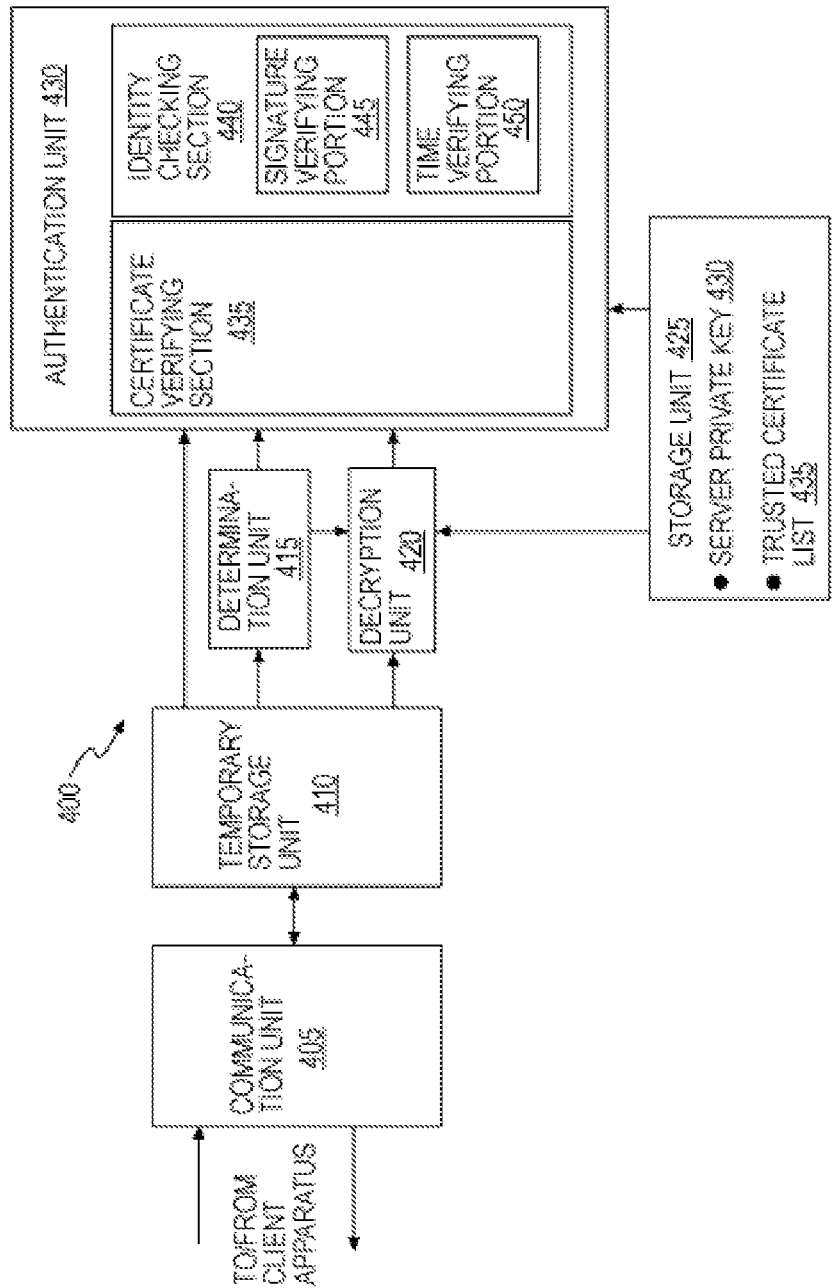

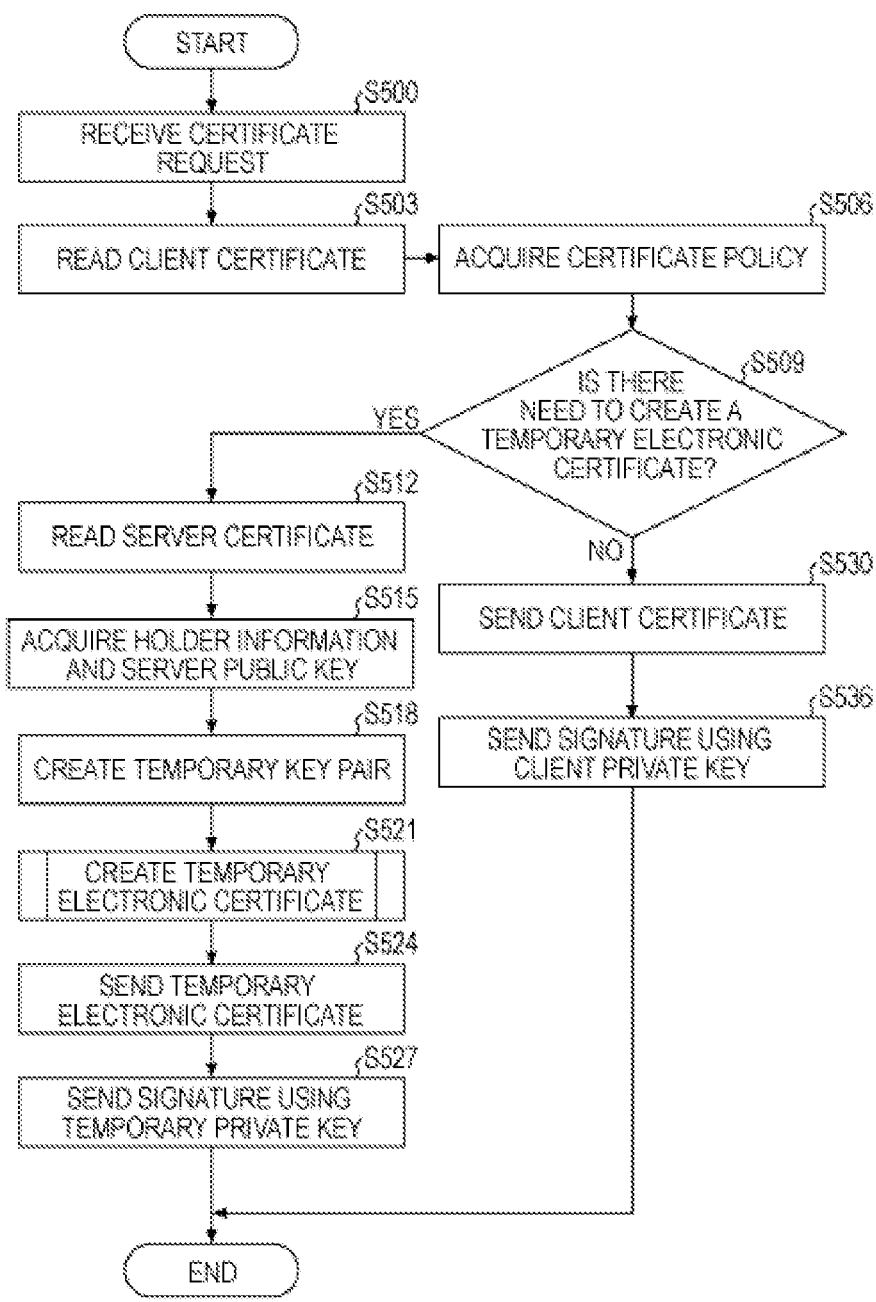

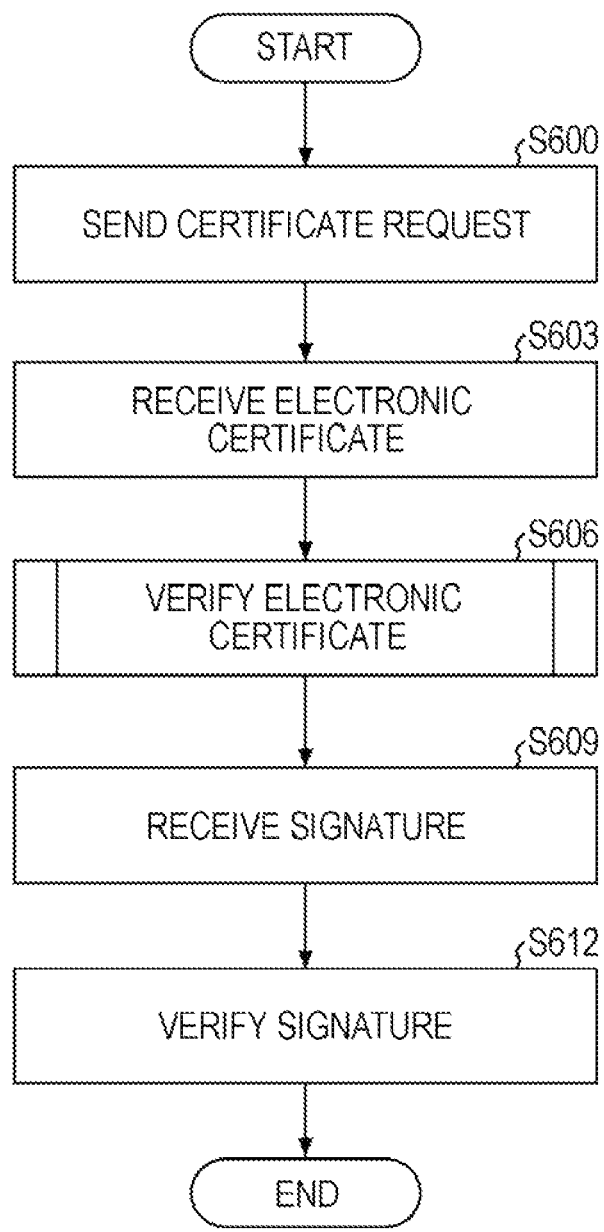

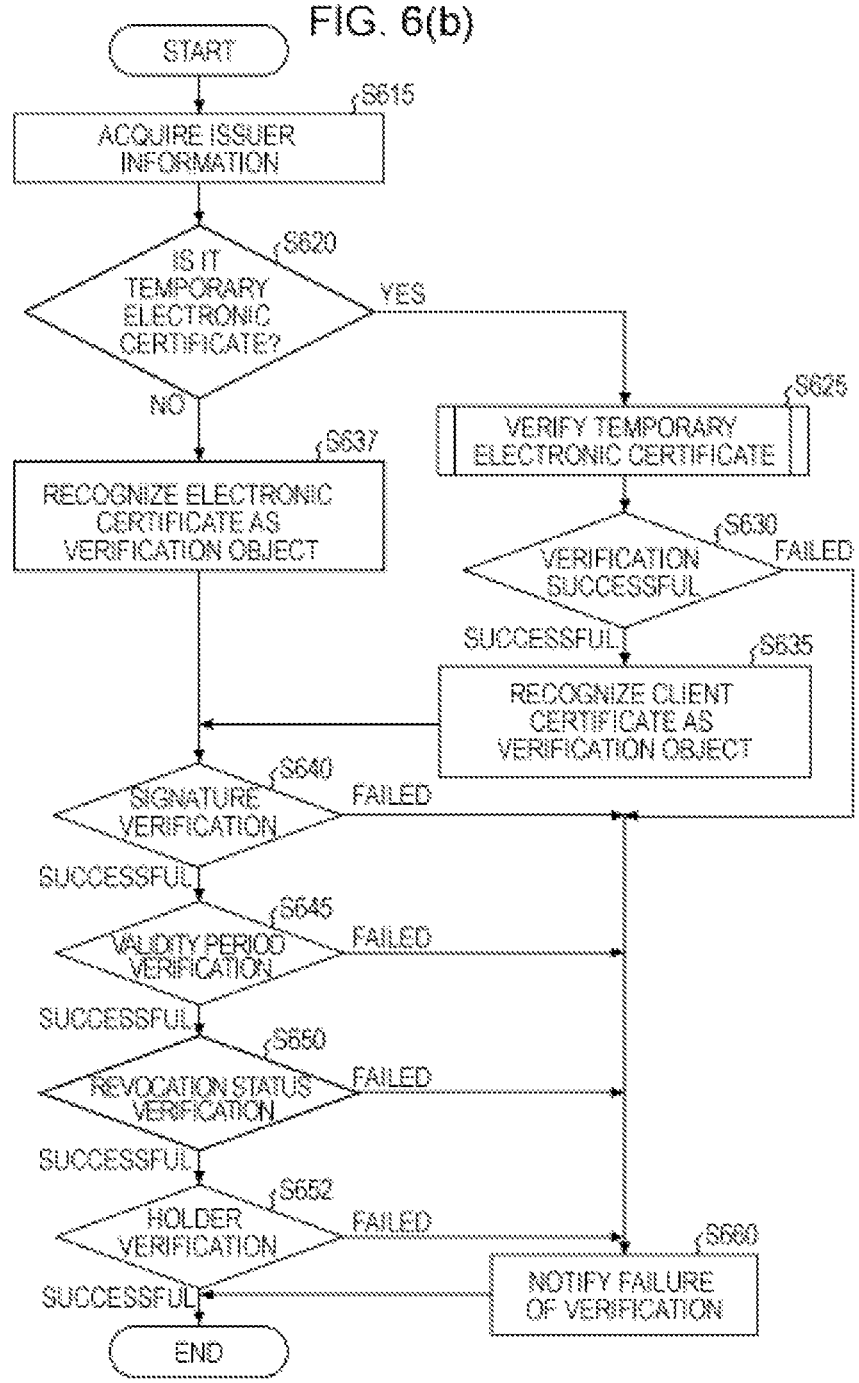

SYSTEM, APPARATUS, METHOD, AND PROGRAM PRODUCT FOR AUTHENTICATING COMMUNICATION PARTNER USING ELECTRONIC CERTIFICATE CONTAINING PERSONAL INFORMATION

CROSS-REFERENCE TO RELATED APPLICATIONS

This application is a continuation application of and claims priority from U.S. patent application Ser. No. 11/842,482, filed on Aug. 21, 2007, which claims priority from Japanese Patent Application Serial No. JP2006-293253, filed on Oct. 27, 2006.

BACKGROUND OF THE INVENTION

1. Field of the Invention

The present invention relates to authentication of communication partners using electronic certificates. In particular, the present invention relates to techniques for authenticating communication partners using electronic certificates containing personal information.

2. Background Art

In server-client data communications that require secure communication, such as electronic commerce and on-line banking, SSL (Secure Socket Layer) and TLS (Transport Layer Security), which is a technique developed later than SSL and standardized by IETF (Internet Engineering Task Force) as RFC 2246, have conventionally been used. In SSL/TLS handshake protocols, prior to initiating cryptographic communications, negotiations of various parameters necessary for initiating cryptographic communications between servers and clients are performed. In such handshake protocols, authentication of communication partners is performed first, and then the optimum algorithms are determined from among compression/encryption algorithms commonly available to both the clients and the servers. When the negotiations using handshake protocols are normally completed, cryptographic communications between the server and clients are initiated.

Now, partner authentication using a handshake protocol will be described using an example in which a server apparatus authenticates a client apparatus. In partner authentication of a handshake protocol which adopts public key cryptography, in response to a CertificateRequest message sent from the server apparatus, the client apparatus includes an electronic certificate of the client apparatus in the body of a ClientCertificate message and sends the message to the server apparatus. Upon receiving the electronic certificate, the server apparatus checks the validity of the electronic certificate using a key obtained from a root certificate authority (CA). In addition to the public key, the electronic certificate contains bibliographic information such as information on the holder of a private key corresponding to the public key (i.e., a subscriber of the electronic certificate) and the validity period of the public key. The server apparatus refers to the bibliographic information so as to check that the client apparatus is an appropriate communication partner.

Then, the client apparatus creates a signature by encrypting a digest of content of communication including content from a ClientHello message, which is an initiation message of a handshake protocol, to a ClientKeyExchange message using a private key of the client apparatus. Then, the client apparatus includes the signature in the body of a CertificateVerify message and sends the CertificateVerify message to the server apparatus. The server apparatus decrypts the information included in the body of the CertificateVerify message using the public key contained in the electronic certificate of the client apparatus so as to check that the current communication partner is the holder of the electronic certificate (see, Non-patent Document 1).

Thus, the partner authentication provided by SSL/TLS is very stringent, and can thus be considered to be the most suitable authentication scheme to be employed in electronic governments and electronic corporations, where spoofing and tampering by a third party are of great concern. Recently, a public individual authentication service was inaugurated as a foundation of electronic governments and electronic corporations (see, Non-patent Document 2). In such a public individual authentication service, prefectural governors issue electronic certificates to be used for electronic application/notification services provided by public administrations. Electronic certificates can be issued at low cost to any person living in any region. Thus, it is desirable that electronic certificates issued through public individual authentication service are used as client certificates for SSL/TLS.

NON-PATENT REFERENCE DOCUMENTS

[Non-Patent Document 1] DIERKS, T., and RESCORLA, E. The Transport Layer Security (TLS) Protocol. RFC 4346 [online], April 2006 [retrieved on 2006-09-22]. Retrieved from the Internet: <URL: http://www.ietf.org/rfc/rfc4346.txt>.

[Non-Patent Document 2] Koteki Kojin Ninshou Sabisu Potaru Saito (Public Individual Authentication Services Portal Site). [online] site launched on Jan. 29, 2004. Koteki Kojin Ninshou Sabisu Todouhuken Kyougikai (Prefectural Association for JPKI), [retrieved on 2006-09-22]. Retrieved from the Internet: <URL: http://www.jpki.go.jp/index1.html>.

Problems to be Solved by the Invention

However, electronic certificates issued through public individual authentication services contain information on holders of public keys which is listed in a basic resident register including the names, addresses, dates of births, and genders of the holders. Thus, if such electronic certificates are used as SSL/TLS client certificates, the personal information such as names and address are sent without being encrypted since partner authentication is performed before initiation of cryptographic communications, as described above. In addition, X.509, which is a standard of electronic certificates recommended by ITU (International Telecommunication Union) is known. X.509 is employed in SSL/TLS as a standard specification. However, an X.509 certificate does not have a mechanism in which the listed information is securely transmitted.

Thus, an object of the present invention is to provide a method, an apparatus, a system, and a program product which prevent unauthorized access to personal information such as interception of personal information in authentication of a communication partner using an electronic certificate containing personal information. Another object of the present invention is to maintain compatibility with a conventional technique for authenticating a communication partner in secure communication partner authentication which uses an electronic certificate containing personal information.

Means for Solving the Problems

The present invention for achieving the above objects is realized by a method for authenticating a communication partner using an electronic certificate containing personal information as described below. This method is initiated when a client apparatus receives a request for an electronic certificate from a server apparatus. In response to the reception of the request, the client apparatus reads a client certificate containing personal information and a server public key of the server apparatus from a storage device of the client apparatus. Then, the client apparatus encrypts the client certificate containing personal information using the server public key. Then, the client apparatus creates a temporary electronic certificate by setting in a field of an electronic certificate in a format supported by the server apparatus determination information indicating that the electronic certificate is a temporary electronic certificate and by setting the encrypted client certificate in a second field of the electronic certificate. After the temporary electronic certificate is created, the client apparatus sends the temporary electronic certificate to the server apparatus.

In response to the reception of the electronic certificate, the server apparatus retrieves the determination information from the first field of the received electronic certificate. Then, the server apparatus determines whether or not the received electronic certificate is a temporary electronic certificate. If the received electronic certificate is not a temporary electronic certificate, the server apparatus authenticates the client apparatus using the received electronic certificate. On the other hand, if the received electronic certificate is a temporary electronic certificate, the server apparatus authenticates the client apparatus using the client certificate recorded in the second field of the temporary electronic certificate. In the latter case, as preprocessing, the server apparatus retrieves the encrypted client certificate from the second field and decrypts the client certificate using a server private key corresponding to the server public key.

Personal information contained in a client certificate is arbitrary information that allows the identification of an individual, such as name, address, date of birth, gender, company name, and e-mail address. The client certificate containing such personal information may be an electronic certificate of a client issued through a public individual authentication service. In this case, the electronic certificate contains the name, address, date of birth, and gender, which are recorded in a basic resident register, of the holder of a private key corresponding to a public key recorded in the electronic certificate.

A format supported by the server apparatus may be the X.509 format. Preferably, the first field refers to a basic field of an X.509 certificate, and the second field refers to an extension field of the X.509 certificate. Alternatively, the first field of an electronic certificate in a format supported by the server apparatus is an extension field of an X.509 certificate, and a certificate policy may be used as determination information indicating that the electronic certificate is a temporary electronic certificate. In addition, a request received by the client apparatus may be a CertificateRequest message of a handshake protocol for SSL (Secure Socket Layer) or TLS (Transport Layer Security).

The client apparatus can further set, in the second field of the electronic certificate, a predetermined character string and a signature value obtained by encrypting a hash value of the character string using a client private key corresponding to the client public key contained in the client certificate. In this case, the server apparatus further obtains the hash value of the character string recorded in the second field of the temporary electronic certificate, provided it is determined that the received electronic certificate is a temporary electronic certificate. In addition, the server apparatus decrypts the signature value recorded in the second field of the temporary electronic certificate using the client public key recorded in the client certificate. Then, the server apparatus determines if these two values match so as to check that a communication partner is the holder of the client certificate.

Alternatively, the client apparatus can further set, in the second field of the electronic certificate, a predetermined character string, a signature time indicating a current time, and a signature value obtained by encrypting a hash value of the predetermined character string and the signature time using the client private key corresponding to the client public key contained in the client certificate. The current time is obtained at the time of signature in the client apparatus. In this case, the server apparatus further obtains a hash value of the predetermined character string and the signature time recorded in the second field of the temporary electronic certificate, provided that it is determined that the received electronic certificate is a temporary electronic certificate. In addition, the server apparatus decrypts the signature value recorded in the second field of the temporary electronic certificate using the client public key recorded in the client certificate. By determining whether or not these two values match, the server apparatus can check that the communication partner is the holder of the client certificate.

It is preferable that the server apparatus acquires a current time on the server apparatus, provided that the received electronic certificate is a temporary electronic certificate. Then the server apparatus obtains the difference between the current time and the signature time recorded in the second field of the temporary electronic certificate and determines whether or not the obtained difference is within an allowable range, so that the reuse of identity verification information which has been used in the past is prohibited.

In the foregoing, the present invention is described as a method for authenticating a communication partner in a system including a client apparatus and a server apparatus. However, the present invention can be understood as a system for authenticating a communication partner or a program product for causing the system to execute the above method. The present invention can also be understood as a method for authenticating a communication partner which is performed in a server apparatus or a client apparatus or a program product for causing the client apparatus or the server apparatus to execute the method. Further, the present invention can be understood as a client apparatus or a server apparatus for authenticating a communication partner.

Advantages

According to the present invention, unauthorized access to personal information such as interception of personal information in authentication of a communication partner using an electronic certificate containing personal information can be prevented. Further, with a technique for authenticating a communication partner according to the present invention, compatibility with a conventional communication partner authentication technique can be maintained.

BRIEF DESCRIPTION OF THE DRAWINGS

FIG. 2 illustrates an example of a functional configuration of a client apparatus 200 according to an embodiment of the present invention.

FIG. 3(a) illustrates a format of an X.509 certificate. FIG. 3(b) illustrates an example of a client certificate containing personal information according to an embodiment of the present invention. FIG. 3(c) illustrates an example of a temporary electronic certificate according to an embodiment of the present invention.

FIG. 4 illustrates an example of a functional configuration of a server apparatus 400 according to an embodiment of the present invention.

FIG. 5(a) is a flowchart illustrating an example of a procedure of processing performed by a client apparatus 200 for communication partner authentication by a server apparatus 400.

FIG. 6(a) is a flowchart illustrating an example of a procedure of processing performed by a server apparatus 400 for authenticating a communication partner according to an embodiment of the present invention. FIG. 6(b) is a flowchart illustrating an example of a procedure of processing for verifying an electronic certificate according to an embodiment of the present invention.

BEST MODE FOR CARRYING OUT THE INVENTION

Figure 1:
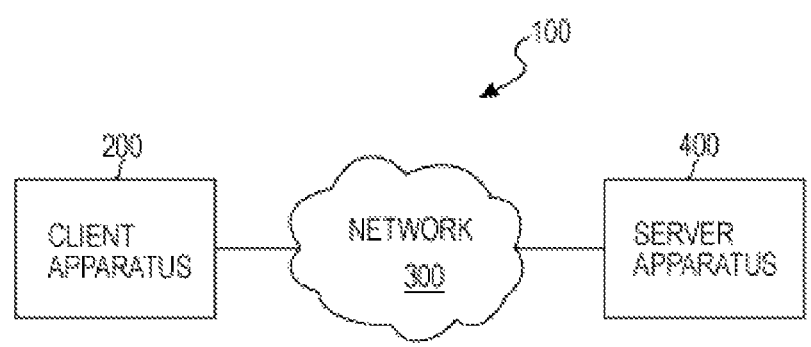
FIG. 1 illustrates an example of a configuration of a system 100 for authenticating a communication partner according to an embodiment of the present invention.

In the following, the preferred embodiments of the present invention will be described in detail on the basis of the drawings. However, the embodiments described below are not intended to limit the invention in accordance with the claims, and not all combinations of the features described in the embodiments are essential to the solving means in accordance with the invention. Throughout the description of the embodiments, like reference numerals are applied to the like elements.

FIG. 1 illustrates an example of a configuration of a system 100 for authenticating a communication partner according to an embodiment of the present invention. The system 100 for authenticating a communication partner according to an embodiment of the present invention is intended to prevent unauthorized access to personal information through interception or the like when a client apparatus 200 sends an electronic certificate containing personal information of the client apparatus 200 in response to a request for electronic certificate sent from the server apparatus 400, and also to maintain compatibility with a conventional method for authenticating a communication partner. Note that in the present embodiment, a conventional communication partner authenticating method is based on an SSL/TLS handshake protocol.

The system 100 for authenticating a communication partner has the client apparatus 200 which requests communication with the server apparatus 400 and the server apparatus which requests an electronic certificate for authenticating a communication partner. The client apparatus 200 and the server apparatus 400 are connected to each other via a network 300 such as the Internet. It is assumed that the client apparatus 200 has acquired an electronic certificate of a client which contains personal information as an electronic certificate for proving the identity of the client apparatus 200.

In communications using SSL/TLS, authentication of communication partners is performed at an early stage of a procedure in accordance with a handshake protocol. The server apparatus 400 sends the client apparatus 200 a Server-Certificate message which contains a server certificate. The server certificate contains a public key of a server based on public key cryptography. Thus, at this time, the client apparatus 200 acquires the server public key. Then, the server apparatus 400 sends a ClientCertificate message to the client apparatus 200 to request the client apparatus 200 for an electronic certificate. Upon receiving the request, the client apparatus 200 reads from a storage device of the client apparatus 200 the client certificate containing personal information and the server public key of the server apparatus 400 and encrypts the client certificate with the server public key so as to prevent unauthorized access to the personal information.

The encrypted client certificate is not recognized by the server apparatus 400. Thus, the client apparatus 200 creates a temporary electronic certificate which conforms to an electronic certificate format supported by the server apparatus 400. SSL/TLS employs the X.509 format for electronic certificates. X.509 has a plurality of versions, and a version 3 certificate, which is most widely used, is provided with basic fields in which basic information such as issuer information and a public key is recorded and with extension fields in which unique information can be recorded. Thus, the client apparatus 200 creates a temporary electronic certificate by setting, in a basic field or an extension field of an X.509 certificate, determination information indicating that the electronic certificate is a temporary electronic certificate and by setting an encrypted client certificate in an extension field of the X.509 certificate. The client apparatus 200 includes the temporary electronic certificate in the ClientCertificate message and sends the ClientCertificate message to the server apparatus 400.

The server apparatus 400 receives the ClientCertificate message including the temporary electronic certificate and retrieves the determination information from the basic field or extension field of the temporary electronic certificate. Then, the server apparatus 400 determines whether or not the received electronic certificate is a temporary electronic certificate. If the server apparatus 400 determines that the received electronic certificate is not a temporary electronic certificate, the server apparatus 400 authenticates the client apparatus using the received electronic certificate. On the other hand, if the server apparatus 400 determines that the received certificate is a temporary electronic certificate, the server apparatus 400 retrieves the encrypted client certificate from the extension field of the temporary electronic certificate and decrypts the encrypted client certificate using a server private key corresponding to the server public key. The server apparatus 400 authenticates the client apparatus using the decrypted client certificate.

As described above, the client apparatus 200 sets a true electronic certificate proving the identity of the client apparatus 200 within an electronic certificate in a format supported by the server apparatus 400. This allows the client apparatus 200 to send an encrypted client certificate containing personal information, and thus unauthorized access by a third party to the personal information can be prevented. The server apparatus 400 determines whether or not a received electronic certificate is a temporary electronic certificate using determination information recorded in a predetermined field. This allows the server apparatus 400 to change an electronic certificate to be used for partner authentication in accordance with the result of the determination, and thus compatibility with a conventional communication partner authentication technique can be maintained.

FIG. 2 illustrates an example of a functional configuration of the client apparatus 200 according to an embodiment of the present invention. The client apparatus 200 has a storage unit 205, a temporary certificate creating unit 235, a policy determining unit 280, a signature creating unit 285, and a communication unit 275. The temporary certificate creating unit 235 has a function of creating a temporary electronic certificate that conforms to an electronic certificate format supported by the server apparatus 400. The temporary certificate creating unit 235 includes a temporary key generating section 240, a basic field setting section 245, an encryption section 250, a time acquiring section 255, a signature value calculating section 260, an extension field setting section 265, and a signature setting section 270. The storage unit 205 stores a client certificate 230, which has been acquired beforehand and contains personal information, a client private key 225 corresponding to a client public key based on public key cryptography, which is recorded in the client certificate 230, a server certificate 215 obtained from the server apparatus 400, a predetermined character string 210, and a temporary certificate creation object policy list 232.

Referring now to FIG. 3(a), a format of an X.509 version 3 electronic certificate employed in SSL/TLS will be described. An X.509 certificate is generally composed of basic fields and extension fields. In the basic fields, a version number of X.509, a certificate serial number, a hash algorithm and a public key algorithm used in certificate signature (signature scheme), information on an certificate issuer, bibliographic information including a validation period of a public key set in the basic fields and information on the holder of a corresponding private key, and public key information are set. In the extension fields, CA-unique identification information and holder-unique identification information added since X.509 version 2, and sets of three values added since X.509 version 3 which include an extension type, an extension value, and a critical bit can arbitrarily be set as necessary. For the extension type, not only the standard extension type defined by X.509 version 3, but also a new and unique extension type can be incorporated.

In addition, a signature of a CA, which is obtained by encrypting a hash value obtained by hashing information set in the basic fields and the extension fields using a private key of the CA, is attached to an the X.509 certificate. A person who receives the electronic certificate can check the validity of the electronic certificate by verifying the signature of the CA using a root certificate of the CA. Specifically, it is determined whether or not the hash value obtained by hashing the information set in the basic fields and the extension fields and the signature of the CA, which is decrypted using the root public key recorded in the root certificate of the CA match. Through this determination, it can be checked that the signature is certainly attached by the CA and that the information recorded in the basic fields and the extension fields is not damaged or tampered. Note that the root certificate refers to an electronic certificate signed and issued by a CA that issues the electronic certificate so that the validity of the electronic certificate is proved.

A server certificate 215 stored in the storage unit 205 is sent from the server apparatus 400 to the client apparatus 200 in authentication in communication using SSL/TLS, as described above. Thus, the server certificate 215 according to the present embodiment conforms to the X.509 format. In addition, in the present embodiment, it is assumed that the client certificate 230 which contains personal information and is stored in the storage unit 205 is issued through a public individual authentication service. FIG. 3(b) illustrates an example of a client certificate which is issued through a public individual authentication service and conforms to the X.509 format. The basic fields of the client certificate contain information similar to the information described with reference to FIG. 3(a). In the extension fields of the client certificate 230, a name, a date of birth, a gender, and an address, which are recorded in a basic resident register, are recorded. A certificate policy, which is also recorded in the extension fields, defines the purpose and use of the certificate. In this example, information indicating that the certificate has been issued through the public individual authentication service is stored as an object identifier (OID). The OID refers to a specially formatted number that is internationally registered and approved by a standardization organization and represents a specific object or object class registered under the ISO registration standard. A signature value A attached to the client certificate 230 represents a signature provided by a prefectural governor.

In a public individual authentication service, an electronic certificate and a private key corresponding to a public key certified by the electronic certificate are stored in an IC card of a subscriber. Thus, although it is seen from FIG. 2 that all information pieces necessary for creating a temporary electronic certificate are stored in the storage unit 205, the client certificate 230 and the client private key 225 are stored in the IC card and read out through an IC card reader/writer. The predetermined character string stored in the storage unit 205 is an arbitrary character string suitable to be used as a signature and is obtained beforehand through negotiation with the server apparatus 400. The temporary certificate creation object policy list 232 is a list of certificate policies which can be set in electronic certificates containing personal information. The temporary certificate creation object policy list 232 according to the present embodiment includes a certificate policy indicating that the certificate with the certificate policy set is issued by the public individual authentication service.

The communication unit (receiving unit) 275 receives from the server apparatus 400 a request for electronic certificate and notifies the policy determining unit 280 of the reception of message. In response to the notification of request for electronic certificate, the policy determining unit 280 reads from the storage unit 205 the client certificate 230 and the temporary certificate creation object policy list 232. Then, the policy determining unit 280 determines whether or not the certificate policy recorded in an extension field of the client certificate 230 is listed in the temporary certificate creation object policy list 232.

If the certificate policy of the client certificate 230 is listed in the temporary certificate creation object policy list 232, the policy determining unit 280 requests the temporary certificate creating unit 235 to create a temporary electronic certificate. If the certificate policy of the client certificate 230 is not listed in the temporary certificate creation object policy list 232, i.e., if the client certificate 230 does not contain personal information, the policy determining unit 280 sends the client certificate 230 read from the storage unit 205 to the server apparatus 400 through the communication unit (transmission unit) 275. Since the client certificate 230 according to the present embodiment contains personal information, the policy determining unit 280 requests the temporary certificate creating unit 235 to creates a temporary electronic certificate.

In response to the request from the policy determining unit 280, the temporary certificate creating unit 235 initiates creation of a temporary electronic certificate which conforms to an electronic certificate format supported by the server apparatus 400, i.e., the X.509 format in the present embodiment, as described below. The temporary key generating section 240 generates a pair of keys based on public key cryptography, for use in creating a temporary electronic certificate. That is, the temporary key generating section 240 generates a temporary public key and a corresponding temporary private key. The basic field setting section 245 sets basic fields of a temporary electronic certificate. As an example, the basic field setting section 245 reads holder information stored in the server certificate 215 from the storage unit 205 and copies the read holder information to an issuer information field of the temporary electronic certificate. This allows the server apparatus 400 receiving the temporary electronic certificate to be notified that the electronic certificate is a temporary electronic certificate.

Alternatively, it is also possible that a certificate policy that indicates that the electronic certificate is a temporary electronic certificate is used. The issuer information field in the basic fields of an electronic certificate and the certificate policy field in the extension fields of an electronic certificate are generally used for the purpose of identifying the type of electronic certificate. Thus, when these fields are used to record information indicating that an electronic certificate is a temporary electronic certificate, the content of the electronic certificate is not meaningless to a third party, as in a case where a uniquely defined field is used. The basic field setting section 245 also sets information on a user of the client apparatus 200 in the holder information field and further sets the temporary public key generated by the temporary key generating section 240 in the public key field. An arbitrary appropriate value is set in each of the other fields of the basic fields.

The encryption section 250 reads from the storage unit 205 the client certificate 230 and the server public key 220 recorded in the server certificate 215 and encrypts the client certificate 230 using the server public key 220. The time acquiring section 255 acquires a current time on the client apparatus 200. The signature value calculating section 260 reads the character string 210 from the storage unit 205 and calculates a signature value for the current time acquired by the time acquiring section 255 and the character string as objects to be signed. Specifically, the signature value calculating section 260 hashes the current time and the character string 210 using a hash function and encrypts the resultant hash value using the client private key 225 stored in the storage unit 205.

The hash function used in the signature value calculation can be negotiated beforehand with the server apparatus 400 or can be identical to the hash value used in signing the client certificate 230. In addition, it is also possible that information on a used hash function is sent to the server apparatus 400 using an extension field of a temporary electronic certificate. Further, only the character string 210 read from the storage unit 205 can be an object to be signed in the signature value calculating section 260.

The extension field setting section 265 sets the client certificate 230 encrypted by the encryption section 250 in an extension field of the temporary electronic certificate. The extension field setting section 265 can also add, as identity verification information, the character string 210 read from the storage unit 205, the current time acquired by the time acquiring section 255 (hereinafter referred to as a "signature time"), and a signature value calculated by the signature value calculating section 260, in an extension field of the temporary electronic certificate. The signature setting section 270 signs the temporary electronic certificate. Specifically, the signature setting section 270 sets, in the temporary electronic certificate, a signature value which is obtained by hashing information stored in the basic fields and the extension fields and encrypting the resultant hash value using the server public key 220 recorded in the server certificate 215.

FIG. 3(c) illustrates an example of a temporary electronic certificate created by the temporary certificate creating unit 235. As described above, the determination information (information on the server apparatus 400 in the present embodiment) indicating that the electronic certificate is a temporary electronic certificate is recorded in an issuer information field of a temporary electronic certificate according to the present embodiment. The client certificate 230 which has been encrypted, the character string 210 serving as identity verification information, a signature time, and a signature value C are recorded in the extension fields of the temporary electronic certificate. Further, a signature value B calculated using the server public key of the server apparatus 400 is attached to the temporary electronic certificate. The communication unit (transmission unit) 275 sends the server apparatus 400 the temporary electronic certificate created by the temporary certificate creating unit 235 as a response to the request for electronic certificate.

The temporary storage unit 290 temporarily stores the content of communication over SSL/TLS including content from a ClientHello message, which is an initiation message of a handshake protocol, to a ClientKeyExchange message. The signature creating unit 285 creates a signature which can be used by the server apparatus 400 for checking that the electronic certificate transmitted from the communication unit (transmission unit) 275 has certainly been transmitted from the client apparatus 200, using the above information stored in the temporary storage unit 290. Specifically, the signature creating unit 285 reads the communication content from the temporary storage unit 290 and hashes the read information so as to obtain a hash value. Then, the signature creating unit 285 encrypts the obtained hash value using a private key corresponding to the public key recorded in the electronic certificate to be transmitted, so as to create a signature. The signature creating unit 285 then sends the server apparatus 400 the created signature together with the electronic certificate or after the electronic certificate is transmitted, through the communication unit (transmission unit) 275.

As described above, in the client apparatus 200 according to an embodiment of the present invention, a true electronic certificate, which proves the identity of the client apparatus 200, is set within an electronic certificate in a format supported by the server apparatus 400, using an extension field of an electronic certificate. Thus, a client certificate containing personal information can be sent in an encrypted form, and thus unauthorized access to the personal information by a third party can be prevented.

FIG. 4 illustrates an example of a functional configuration of the server apparatus 400 according to an embodiment of the present invention. The server apparatus 400 has a communication unit 405, a temporary storage unit 410, a determination unit 415, a decryption unit 420, a storage unit 425, and an authentication unit 430. The storage unit 425 stores a server private key 430 and a trusted certificate list 435. In this example, the server private key 430 is a private key corresponding to the server public key 220 contained in the server certificate 215 sent to the client apparatus 200. The trusted certificate list 435 is a list of root certificates of a plurality of CAs. It is assumed that the validity of the root certificates has already been verified by the server apparatus 400. The authentication unit 430 has a function of authenticating a communication partner and includes a certificate verifying section 435 and an identity checking section 440. The identity checking section 440 has a function of checking that an electronic certificate has certainly been sent from the communication partner and includes a signature verifying portion 445 and a time verifying portion 450.

The communication unit 405 receives an electronic certificate from the client apparatus 200 as a response to a request for electronic certificate. The received electronic certificate is stored in the temporary storage unit 410. Specifically, in the present embodiment, issuer information recorded in a basic field of an electronic certificate is read out and it is determined whether or not determination information indicates that the received electronic certificate is a temporary electronic certificate. If the determination information indicates that the received electronic certificate is a temporary electronic certificate, i.e., the issuer information represents the server apparatus 400 in the present embodiment, the determination unit 415 notifies the decryption unit 420 and the authentication unit 430 of the determination result. On the other hand, the determination information does not indicate that the received electronic certificate is a temporary electronic certificate, the determination unit 415 notifies the determination result only to the authentication unit 430.

In response to the notification that the received electronic certificate is a temporary electronic certificate, the decryption unit 420 reads from the temporary storage unit 410 the encrypted client certificate 230 recorded in an extension field of the received electronic certificate. Then, the decryption unit 420 decrypts the read client certificate 230 using the server private key 430 stored in the storage unit 425. The decrypted client certificate 230 is then sent to the authentication unit 430.

If the determination unit 415 determines that the received electronic certificate is not a temporary electronic certificate, the authentication unit 430 authenticates the client apparatus 200 using the received electronic certificate and the signature, which is sent from the client apparatus 200 together with the electronic certificate or after the electronic certificate is sent. On the other hand, if the determination unit 415 determines that the received electronic certificate is a temporary electronic certificate, the authentication unit 430 authenticates the client apparatus 200 using the decrypted client certificate 230 and the signature recorded in the extension field of the temporary electronic certificate. The authentication by the authentication unit 430 is initiated in response to the notification of the determination result sent from the determination unit 415 and is executed by the certificate verifying section 435 and the identity checking section 440.

Basically, a scheme employed for verifying an electronic certificate is not dependent on a result of determination performed by the determination unit 415. Thus, in the following, processing performed by the certification verifying section 435 will be described using an example in which the client certificate 230 containing personal information is verified. When the client certificate 230 containing personal information is an object to be verified, successful result of processing performed by the identity checking section 440 may be used as a precondition for the authentication processing.

The certificate verifying section 435 receives the decrypted client certificate 230 from the decryption unit 420. Then, the certificate verifying section 435 performs verification of the electronic certificate, i.e., verification of the signature attached to the client certificate 230 and checking of bibliographic information recorded in the client certificate 230. The verification of signature is performed as follows. Firstly, the certificate verifying section 435 refers to the issuer information contained in the client certificate 230 so as to search for the root certificate of a corresponding CA (a prefectural governor in the present embodiment) from among the trusted certificate list 435 stored in the storage unit 425. Subsequently, using a root public key contained in the root certificate, the certificate verifying section 435 decrypts the signature attached to the client certificate 230. Then, the certificate verifying section 435 compares the decrypted signature with a hash value obtained by hashing information stored in the basic fields and the extension fields of the client certificate 230 to check if these two values match. If these two values match, the verification is successful. An algorithm used in the signature can be checked by referring to the signature scheme recorded in the client certificate 230.

The checking of the bibliographic information contained in the client certificate 230 involves, for example, checking of the validation period and revocation of the client certificate 230 or checking of the communication partner with reference to information such as holder information and personal information. Now, a scheme for checking the revocation of the client certificate will be described. There are two schemes for a CA to notify a subscriber of the revocation of an electronic certificate. One is Certificate Revocation List (CRL) scheme, in which a CA periodically publishes a list of revoked certificates. The other is Online Certificate Status Protocol (OCSP) scheme, in which a server retaining revocation certificate information responds to a request for the certification revocation information from a client. The former scheme is employed in public individual authentication services. Therefore, in the present embodiment, the certificate verifying section 435 requests a CA for a CRL in advance and checks the revocation status of the client certificate by determining whether or not the client certificate is listed on the received CRL. The checking of the communication party with reference to the personal information described above is performed only when the client certificate 230 containing personal information is an object to be verified.

The identity checking section 440 checks that an electronic certificate to be verified has certainly been sent from the holder of the client certificate 230. If the determination unit 415 has determined that the received electronic certificate is a temporary electronic certificate, the signature verifying portion 445 reads from the temporary storage unit 410 the identity verification information recorded in an extension field of the temporary electronic certificate and performs signature verification. This signature verification using identity verification information is performed as follows. Firstly, the identity checking section 440 obtains a hash value by hashing the character string 210 and the signature time contained in the identity verification information, using a hash function that has been obtained through negotiation with the client apparatus 200. Then, the identity checking section 440 decrypts a signature value C contained in the identity verification information using the client public key contained in the decrypted client certificate 230. Lastly, the identity checking section 440 compares the decrypted signature value C and the hash value. If these two values match, it can be determined that the client certificate 230 has certainly been sent from the holder of the client certificate 230.

On the other hand, if the determination unit 415 determines that the received electronic certificate is not a temporary electronic certificate, the signature verifying portion 445 verifies the signature sent from the client certificate 200 together with the electronic certificate or after the electronic certificate is sent. As mentioned in the above description of the functional configuration of the client certificate 200, in partner authentication using an SSL/TLS handshake protocol, the content of communication including content from a ClientHello message, which is the initiation message of the handshake protocol, to a ClientKeyExchange message, is used as identity verification information. Then, a signature value, which is calculated by encrypting a hash value of the communication content using a private key corresponding to a public key contained in the electronic certificate, is included in the body of a CertificateVerify message to be sent after a ClientCertificate message and is sent from the client certificate 200.

In the case, where the received electronic certificate is considered to be an object to be verified, the signature verifying portion 445 performs signature verification as follows. When the communication unit 405 receives the CertificateVerify message from the client apparatus 200, the signature verifying portion 445 reads the signature value contained in the body of the CertificateVerify message through the temporary storage unit 410. Then, the signature verifying portion 445 decrypts the signature value using the public key contained in the received electronic certificate. The temporary storage unit 410 temporarily stores content of communication including content from the ClientHello message to the ClientKeyExchange. The signature verifying portion 445 reads this communication content from the temporary storage unit 410 and obtains a hash value. Then, the signature verifying portion 445 compares the hash value with the decrypted signature value. If these two values match, it can be determined that the received electronic certificate has certainly been sent from the holder of the electronic certificate.

In this embodiment, even when the client apparatus 200 sends a temporary electronic certificate to the server apparatus 400, the client apparatus 200 creates a CertificateVerify message and sends the message to the server apparatus 400. This is with a view to maintaining compatibility with a conventional method for authenticating a communication partner, i.e., partner authentication performed using an SSL/TLS handshake protocol. A client private key to be used in this case is a temporary private key corresponding to a temporary public key contained in a temporary electronic certificate. However, it is not necessary for the server apparatus 400 to verify a signature contained in the body of the CertificateVerify message.

If a signature time is recorded in an extension field of the temporary electronic certificate, the identity checking section 440 may check that the identity verification information recorded in the extension field of the temporary electronic certificate has not been reused. In this case, the time verifying portion 450 first acquires a current time on the server apparatus 400. Then, the time verifying portion 450 calculates the difference between the current time and the signature time recorded in the extension field of the temporary electronic certificate and determines whether the calculated difference is within an allowable range. If the difference is within the allowable range, it can be determined that the identity verification information has not been reused. Thus, reuse of identity verification information is inhibited by including the signature time in the signature. This arrangement prevents a third party who stole identity verification information by intercepting a temporary electronic certificate from forging a temporary electronic certificate.

As described above, when the server apparatus 400 according to an embodiment of the present invention receives an electronic certificate from the client apparatus 200, the server apparatus 400 first determines whether or not the received electronic certificate is a temporary electronic certificate using determination information recorded in a predetermined field in the electronic certificate. Thus, it is possible that an object to be considered as an electronic certificate for use in partner authentication can be changed in accordance with a result of the determination. Specifically, with the server apparatus 400 according to an embodiment of the present invention, both an encrypted electronic certificate and a normal non-encrypted electronic certificate can be processed, and thus compatibility with a conventional communication partner authentication method can be maintained.

Figure 5B:
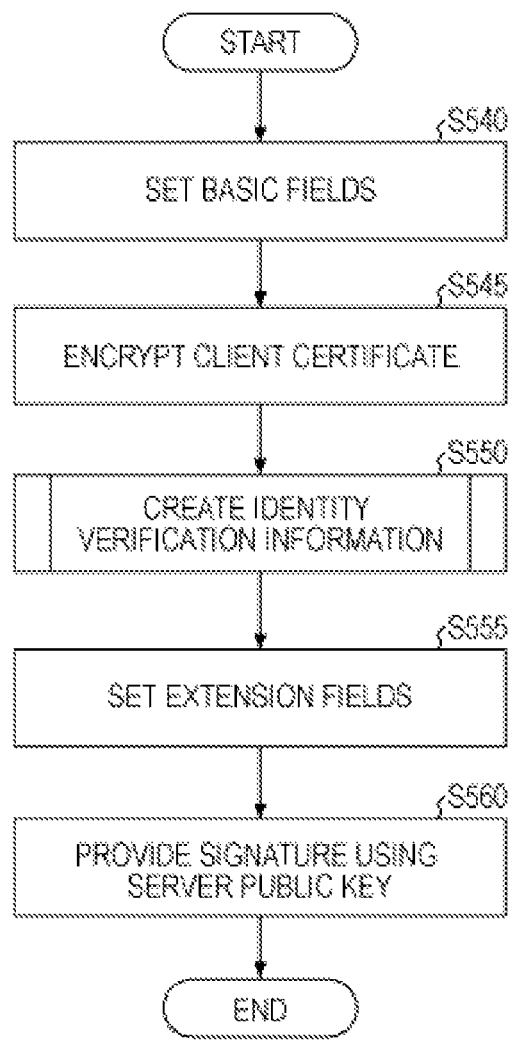
FIG. 5(b) is a flowchart illustrating an example of a procedure of processing for creating a temporary electronic certificate according to an embodiment of the present invention.

Now, referring to flowcharts in FIG. 5, operations of the client apparatus 200 according to the present embodiment will be described. FIG. 5(*a*) illustrates a processing procedure performed by the client apparatus 200 for sending an electronic certificate in response to a request for electronic certificate sent from the server apparatus 400. When the client apparatus 200 receives from the server apparatus 400 a request for electronic certificate for authenticating the client apparatus 200 (STEP 500), the client apparatus 200 reads from the storage unit 205 the client certificate 230 to be sent to the server apparatus 400 and the temporary certificate creation object policy list 232 (STEP 503). The client apparatus 200 then retrieves a certificate policy from an extension field of the client certificate 230 (STEP 506) and determines whether or not the retrieved certificate policy is listed in the temporary certificate creation object policy list 232 (STEP 509).

If the retrieved certificate policy is listed in the temporary certificate creation object policy list 232 (STEP 509: YES), preparation for creating a temporary electronic certificate is initiated. Specifically, the client apparatus 200 first reads the server certificate 215 from the storage unit 205 (STEP 512) and retrieves holder information and a server public key from the read server certificate 215 (STEP 515). The client apparatus 200 generates a pair of keys which is based on public key cryptography for use in the temporary electronic certificate, i.e., a temporary public key and a temporary private key (STEP 518).

When the preparation is completed, the client apparatus 200 creates a temporary electronic certificate which conforms to an electronic certificate format supported by the server apparatus 400, using the prepared information pieces (STEP 521). The creation scheme of the temporary electronic certificate will be described below. When the client apparatus 200 sends the created temporary electronic certificate to the server apparatus 400 (STEP 524), the client apparatus 200 creates a signature using the temporary private key corresponding to the temporary public key contained in the temporary electronic certificate and sends the created signature to the server apparatus 400 (STEP 527).

On the other hand, if NO in STEP 509, i.e., if the retrieved certificate policy is not included in the temporary certificate creation object policy list 232 and thus personal information is not contained in the client certificate 230, the client apparatus 200 sends the server apparatus 400 the client certificate 230 as it is read from the storage unit 205 (STEP 530). Then, the client apparatus 200 creates a signature using a client private key corresponding to a client public key recorded in the client certificate 230 and sends the signature to the server apparatus 400 (STEP 536). The processing procedure is terminated after STEP 527 or STEP 533 is completed.

Referring to FIG. 5(*b*), a processing procedure for creating a temporary electronic certificate will be described. The client apparatus 200 first sets basic fields of a temporary electronic certificate using the information pieces obtained in STEP 515 and STEP 518 in FIG. 5(*a*) (STEP 540). Specifically, the client apparatus 200 sets holder information representing the server apparatus 400 in an issuer information field and sets the temporary public key in a public key information field. An arbitrary appropriate value is set in each of the other fields.

Then, the client apparatus 200 encrypts the client certificate containing personal information using the server public key obtained in STEP S515 in FIG. 5(a) (STEP 545). The client apparatus 200 creates identity verification information to prove that the client certificate is certainly sent from the holder of the client certificate (STEP 550). The creation scheme for identity verification information will be described below. Then, the client apparatus 200 sets the encrypted client certificate and the identity verification information in extension fields of the temporary electronic certificate (STEP 555). At last, the client apparatus 200 signs the temporary electronic certificate using the server public key 220 (STEP 560), and thus the processing procedure is terminated.

Figure 5C:
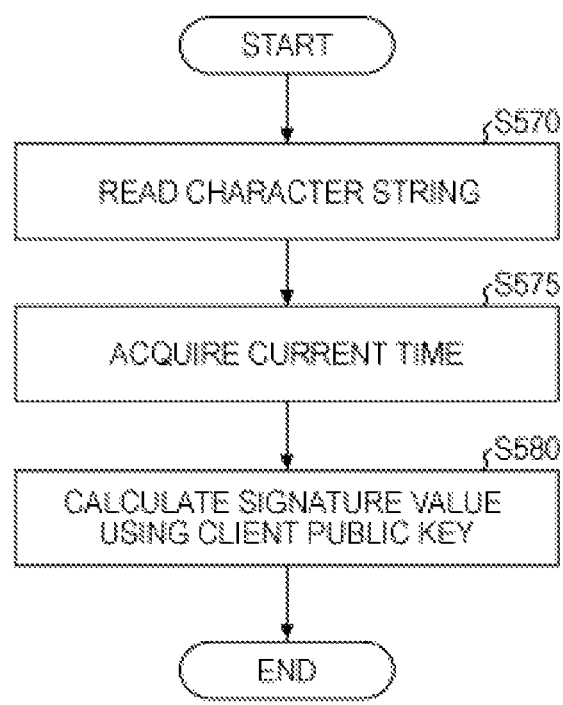
FIG. 5(c) is a flowchart illustrating an example of a procedure of processing for creating identity verification information according to an embodiment of the present invention.

Referring to FIG. 5(c), a processing procedure for creating identity verification information will be described. The client apparatus 200 reads from the storage unit 205 a character string which has been set through negotiation with the server apparatus 400 (STEP 570). Then, the client apparatus 200 acquires a current time on the client apparatus 200 (STEP 575). Then, the client apparatus 200 calculates a signature value for the read character string and current time as objects to be signed, using the client private key corresponding to the client public key recorded in the client certificate 230 (STEP 580), and thus the processing procedure is terminated.

Referring now to flowcharts in FIG. 6, operations performed by the server apparatus 400 according to the present embodiment will be described. FIG. 6(a) briefly illustrates a processing procedure performed by the server apparatus 400. The server apparatus 400 sends a request for electronic certificate in order to authenticate the client apparatus 200, which is the communication partner (STEP 600). When receiving an electronic certificate from the client apparatus 200 (STEP 603), the server apparatus 400 verifies the received electronic certificate (STEP 606). Subsequently, the server apparatus 400 receives a signature from the client apparatus 200 (STEP 609). The server apparatus 400 verifies the signature to check that the received electronic certificate has certainly been sent from the holder of the electronic certificate (STEP 612), and thus the processing procedure is terminated.

Referring to FIG. 6(b), a processing procedure performed by the server apparatus 400 for verifying an electronic certificate will be described. The server apparatus 400 first retrieves issuer information from a basic field of a received electronic certificate (STEP 615) and determines whether or not the received electronic certificate is a temporary electronic certificate (STEP 620). If the received electronic certificate is determined to be a temporary electronic certificate (STEP 620: YES), the server apparatus 400 verifies the temporary electronic certificate (STEP 625). The verification of temporary electronic certificate will be described below. If the verification of the temporary electronic certificate has been successfully completed at STEP 630, the server apparatus 400 recognizes the client certificate 230 include in the temporary electronic certificate as an object to be verified for authentication of the client apparatus 200 (STEP 635). On the other hand, if the temporary electronic certificate is determined to be not a temporary electronic certificate (STEP 620: NO), the server apparatus 400 recognizes the received electronic certificate as an object to be verified for authentication of the client apparatus 200 (STEP 637).

The processing procedure proceeds from STEP 635 or STEP 637 to STEP 640, and the server apparatus 400 verifies a signature provided in the certificate to be verified (STEP 640). If the verification has been successfully completed in STEP 640, the server apparatus 400 verifies that the certificate is valid by referring to the validity period recorded in the certificate to be verified (STEP 645). If the verification of STEP 645 has been successfully completed, the server apparatus 400 communicates with the issuer of the certificate to be verified to verify that the certificate has not been revoked (STEP 650). If the verification of STEP 650 has been successfully completed, the server apparatus 400 refers to the holder information recorded in the certificate to be verified to verify that the client apparatus 200 is an appropriate communication partner (STEP 652). A successful result of the verification of STEP 652 indicates the successful completion of the verification of electronic certificate. The order in which the electronic certificate verification is performed is not limited to the order illustrated in FIG. 6(b).

If the verification of the temporary electronic certificate is failed in STEP 630, or the verification of any of STEP 640, STEP 645, STEP 650, and STEP 652 is failed, the processing procedure proceeds to STEP 660. At STEP 660, the server apparatus 400 notifies the client apparatus 200 of the failure of verification. In SSL/TLS, an alert protocol is used to notify a verification failure. For example, when the validation period of the client apparatus is expired, the server apparatus 400 sends the client apparatus 200 a Certificate expired message. In addition, when the certificate has been revoked, the server apparatus 400 sends the client apparatus 200 a Certificate_revoked message.

Figure 6C:
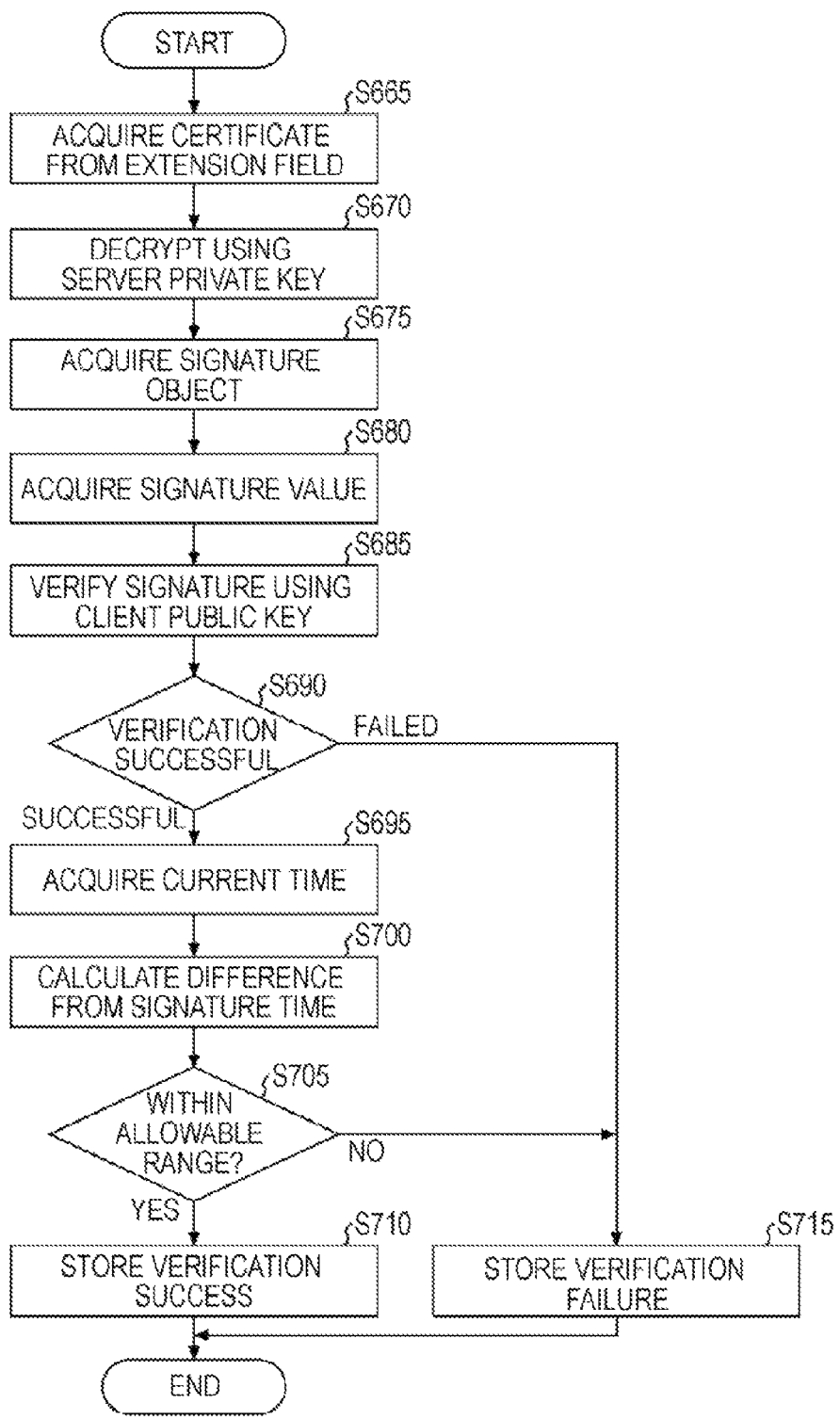
FIG. 6(c) is a flowchart illustrating an example of a procedure of processing of verifying a temporary electronic certificate according to an embodiment of the present invention.

Referring to FIG. 6(c), a processing procedure performed by the server apparatus 400 for verifying a temporary electronic certificate will be described. The server apparatus 400 first retrieves an encrypted client certificate 230 from an extension field of the temporary electronic certificate (STEP 665) and decrypts the client certificate 230 using the server private key 430 read from the storage unit 425 (STEP 670). Then, the server apparatus 400 retrieves objects to be signed which are recorded as identity verification information, i.e., the character string and signature time, from an extension field of the temporary electronic certificate (STEP 675) and calculates a hash value of the signature objects using a predetermined hash value.

The server apparatus 400 also retrieves a signature value recorded as the identity verification information from extension field of the temporary electronic certificate (STEP S680). The server apparatus 400 decrypts the retrieved signature value using a client public key recorded in the decrypted client certificate and compares the decrypted signature value with the hash value so as to verify the signature (STEP 685).

If the verification has been successfully competed at STEP 690, i.e., if it can be determined that the client certificate 230 has certainly been sent from the holder of the client certificate 230, the server apparatus 400 further acquires a current time on the server apparatus 400 (STEP 695). Then, the server apparatus 400 calculates a difference between the acquired current time and a signature time recorded in an extension field of the temporary electronic certificate (STEP 700). If the calculated difference is within an allowable range (STEP 705: YES), i.e., if it can be determined that the identity verification information recorded in the extension field of the temporary electronic certificate has not been reused, the server apparatus 400 stores the verification success (STEP 710). If the signature verification of STEP 690 has been failed, or the value calculated in STEP 705 is not within the allowable range, the server apparatus 400 stores the verification failure (STEP 715), and thus the processing procedure is terminated.

Figure 7:
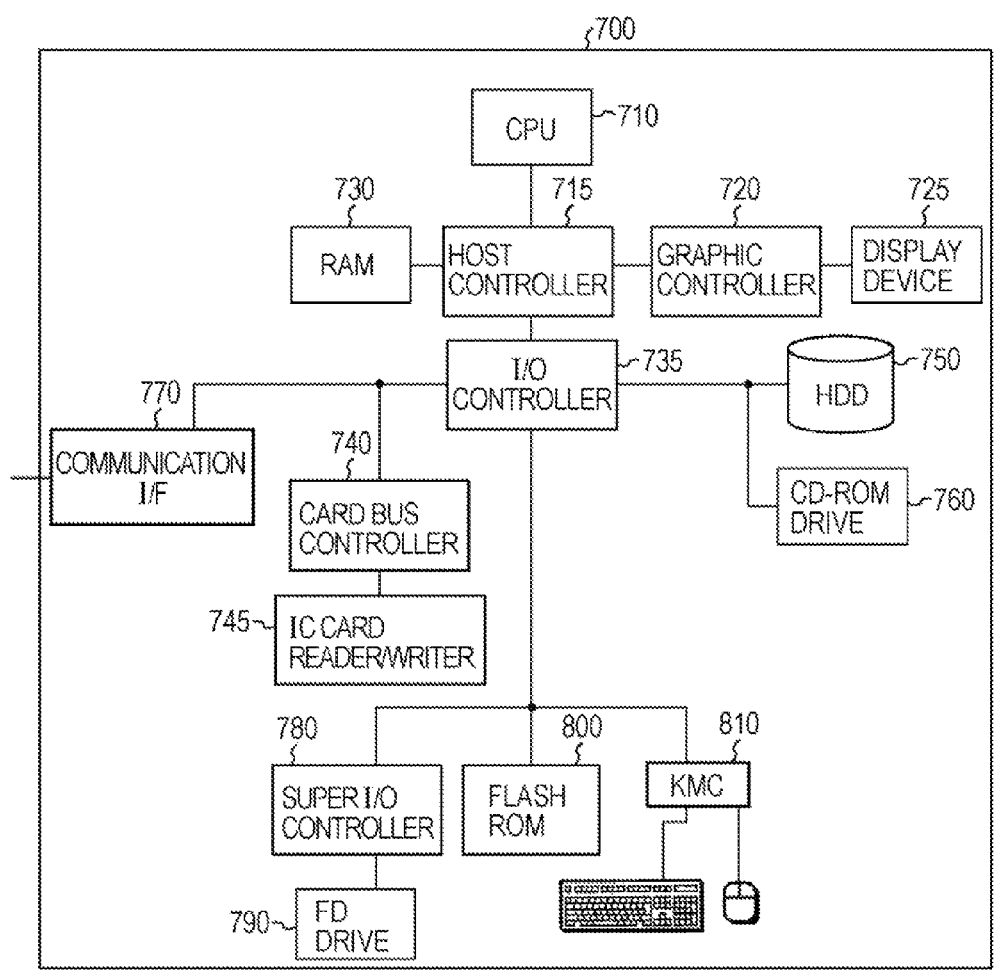
FIG. 7 illustrates an example of a hardware configuration of a client apparatus 200 and a server apparatus 400 according to an embodiment of the present invention.

FIG. 7 illustrates an example of a hardware configuration of the client apparatus 200 according to the present embodiment. FIG. 7 also illustrates an example a hardware configuration of the server apparatus 400. In the following, FIG. 7 is referred to as illustrating the hardware configuration of the client apparatus 200. The client apparatus 200 is provided with a CPU peripheral part including a CPU 710 and a RAM 730 which are interconnected via a host controller 715, an input/output part including a card bus controller 740 connected to the host controller 715 through an input/output controller 735, an IC card reader/writer 745 connected to the card bus controller 740, a communication interface 770, a hard disk drive 750, and a CD-ROM drive 760, and a legacy input/output part including a super I/O controller 780 connected to the input/output controller 735, a flexible disk drive 790 connected to the super I/O controller 780, a flash ROM 800, and a keyboard/mouse controller 810.

The host controller 715 connects the RAM 730 to the CPU 710 which accesses the RAM 730 at a high transfer rate. The CPU 710 operates on the basis of a program stored in a hard disk and controls each component. A program for the client apparatus 200 for authenticating a communication partner according to an embodiment of the present invention is stored in the hard disk and executed by the CPU 710 using the RAM 730. The program for the client apparatus 200 causes the client apparatus 200 to function as the storage unit 205, the policy determining unit 280, the signature creating unit 285, the temporary storage unit 290, the temporary certificate creating unit 235, i.e., the temporary key generating section 240, the basic field setting section 245, the encryption section 250, the time acquiring section 255, the signature value calculating section 260, the extension field setting section 265, and the signature setting section 270, and the communication unit 275. The functions and operations of these components are similar to those explained using FIG. 2 and FIG. 5, and thus the descriptions thereof will be omitted.

On the other hand, a program for the server apparatus 400 according to an embodiment of the present invention causes the server apparatus 400 to function as the communication unit 405, the temporary storage unit 410, the determination unit 415, the decryption unit 420, the storage unit 425, and the authentication unit 430, i.e., the certificate verifying section 435 and the identity checking section 440 including the signature verifying portion 445 and the time verifying portion 450. The functions and operations of these components are similar to those described using FIG. 4 and FIG. 6, and thus the descriptions thereof will be omitted. The programs for the client apparatus 200 and the server apparatus 400 according to an embodiment of the present invention can be stored in a computer-readable medium. The computer-readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of computer-readable media include semiconductors or solid state memories, magnetic tapes, removable computer diskettes, random access memories (RAMs), read-only memories (ROMs), rigid magnetic disks and optical disks. Current examples of optical disks include compact disk-read only memories (CD-ROMs), compact disk-read/writes (CD-R/Ws) and DVDs.

The input/output controller 735 connects the host controller 715 to the card bus controller 740, which is a relatively high speed input/output device, the IC card reader/writer 745 connected to the card bus controller 740, the communication interface 770, the hard disk drive 750, and the CD-ROM drive 760. The communication interface 770 communicates with an external apparatus such as the server apparatus 400 via a network.

The input/output controller 735 is connected to a relatively low-speed input/output device such as the flexible disk drive 790 and the keyboard/mouse controller 810 and to the flash ROM 800. The flash ROM 800 stores a boot program to be executed by the CPU 710 when the client apparatus 200 is activated and a program dependent on the hardware of the client apparatus 200. The flexible disk drive 790 reads the program or data from a flexible disk and supplies the program or data to the RAM 730 through the super I/O controller 780. The super I/O controller 780 connects a flexible disk and also connects various input/output devices through, for example, a parallel port, a serial port, a keyboard port, and mouse port.

While the present invention has been described with reference to the above embodiments, the technical scope of the present invention is not limited to the above described embodiments. It is to be understood by those skilled in the art that various modifications or improvements can be added to the above embodiments. It is also apparent that such modified or improved implementations fall within the technical scope of the present invention.

What is claimed is:

1. A method for authenticating a communication partner using an electronic certificate containing personal information, the method comprising:
   receiving from a client apparatus, by a server apparatus, an electronic certificate of a client certificate containing personal information;
   determining, by the server apparatus, that the received electronic certificate is a temporary electronic certificate;
   in response to determining that the received electronic certificate is a temporary electronic certificate, retrieving, by the server apparatus, the encrypted client certificate from the second field of the temporary electronic certificate;
   decrypting, by the server apparatus, the retrieved client certificate using a server private key corresponding to the server public key; and
   authenticating, by the server apparatus, the client apparatus using the decrypted client certificate containing the personal information.

2. The authentication method according to claim 1, wherein the electronic certificate format supported by the server apparatus is X.509 format.

3. The authentication method according to claim 1, wherein the first field is a basic field of an X.509 certificate, and the second field is an extension field of the X.509 certificate.

4. The authentication method according to claim 1, wherein the first field is an extension field of an X.509 certificate, and in the first field of the electronic certificate in the format supported by the server apparatus, a certificate policy is used as the determination information indicating that the electronic certificate is a temporary electronic certificate.

5. The authentication method according to claim 1, wherein the request for an electronic certificate received in the client apparatus is a certificate request message of a handshake protocol for SSL (Secure Socket Layer) or TLS (Transport Layer Security).

6. The authentication method according to claim 1, further comprising the step of checking that a communication partner is the holder of a client certificate by comparing a hash value obtained from a predetermined character string contained in the second field of the temporary electronic certificate with a value obtained by decrypting a signature value contained in the second field of the temporary electronic certificate using a client public key retrieved from the client certificate.

7. The authentication method according to claim 1, further comprising the steps of—checking that a communication partner is a holder of a client certificate by comparing a hash value obtained from a predetermined character string and a signature time contained in the second field of the temporary electronic certificate with a value obtained by decrypting a signature value contained in the second field of the temporary electronic certificate using a client public key retrieved from the client certificate.

8. The authentication method according to claim 7, further comprising the steps of:
acquiring a current time on the server apparatus and determining that a difference between the current time and the signature time retrieved from the second field of the temporary electronic certificate is within an allowable range.

9. A method executed in a client apparatus, for authenticating a communication partner using an electronic certificate containing personal information, the method comprising:
encrypting, by a client apparatus, a client certificate that includes personal information using a server public key;
creating, by the client apparatus, a temporary electronic certificate by setting determination information in a first field of an electronic certificate and the encrypted client certificate in a second field of the electronic certificate, the determination information indicating that the electronic certificate is a temporary electronic certificate; and
sending, by the client apparatus, the temporary electronic certificate to the server apparatus.

10. A client apparatus for authenticating a communication partner using an electronic certificate containing personal information, the client apparatus comprising a computer processor and a computer readable medium that includes computer program instructions that when executed by the computer processor cause the server apparatus to carry out the steps of:
encrypting, by a client apparatus, a client certificate that includes personal information using a server public key;
creating, by the client apparatus, a temporary electronic certificate by setting determination information in a first field of an electronic certificate and the encrypted client certificate in a second field of the electronic certificate, of which format is supported by a server apparatus, the determination information indicating that the electronic certificate is a temporary electronic certificate; and
sending, by the client apparatus, the temporary electronic certificate to the server apparatus.

11. A server apparatus for authenticating a communication partner using an electronic certificate containing personal information, the server apparatus comprising a computer processor and a computer readable medium that includes computer program instructions that when executed by the computer processor cause the server apparatus to carry out the steps of:
receiving from a client apparatus, by the server apparatus, an electronic certificate of a client certificate containing personal information;
determining, by the server apparatus, that the received electronic certificate is a temporary electronic certificate;
in response to determining that the received electronic certificate is a temporary electronic certificate, retrieving, by the server apparatus, the client certificate having been encrypted using a server public key of the server apparatus from a second field of the received electronic certificate;
decrypting, by the server apparatus, the encrypted client certificate using a server private key corresponding to the server public key; and
authenticating, by the server apparatus, the client apparatus using the decrypted client certificate that contains the personal information.

12. A program product for authenticating a communication partner using an electronic certificate containing personal information, the program product disposed on a computer readable storage medium, wherein the computer readable storage medium is not a signal, the program product comprising computer program instructions that when executed by a computer cause the computer to carry out the steps of:
encrypting, by a client apparatus, a client certificate that includes personal information using a server public key;
creating, by the client apparatus, a temporary electronic certificate by setting determination information in a first field of an electronic certificate and the encrypted client certificate in a second field of the electronic certificate, of which format is supported by a server apparatus, the determination information indicating that the electronic certificate is a temporary electronic certificate; and
sending, by the client apparatus, the temporary electronic certificate to the server apparatus.

13. A program product for authenticating a communication partner using an electronic certificate containing personal information, the program product disposed on a computer readable storage medium, wherein the computer readable storage medium is not a signal, the program product comprising computer program instructions that when executed by a computer cause the computer to carry out the steps of:
receiving from a client apparatus, by a server apparatus, an electronic certificate of a client certificate containing personal information;
determining, by the server apparatus, that the received electronic certificate is a temporary electronic certificate;
in response to determining that the received electronic certificate is a temporary electronic certificate, retrieving, by the server apparatus, the client certificate having been encrypted using a server public key of the server apparatus from a second field of the received electronic certificate;
decrypting, by the server apparatus, the encrypted client certificate using a server private key corresponding to the server public key; and
authenticating, by the server apparatus, the client apparatus using the decrypted client certificate that contains the personal information.

\* \* \* \* \*